J. E. PÉRILLARD.
MOTOR WHEEL FOR CYCLES.
APPLICATION FILED APR. 1, 1907.

904,721.

Patented Nov. 24, 1908.

2 SHEETS—SHEET 1.

S. A. Rogers.
E. A. Pell.

Inventor:
Jules Emile Périllard,
By Wm H Camfield.
Atty.

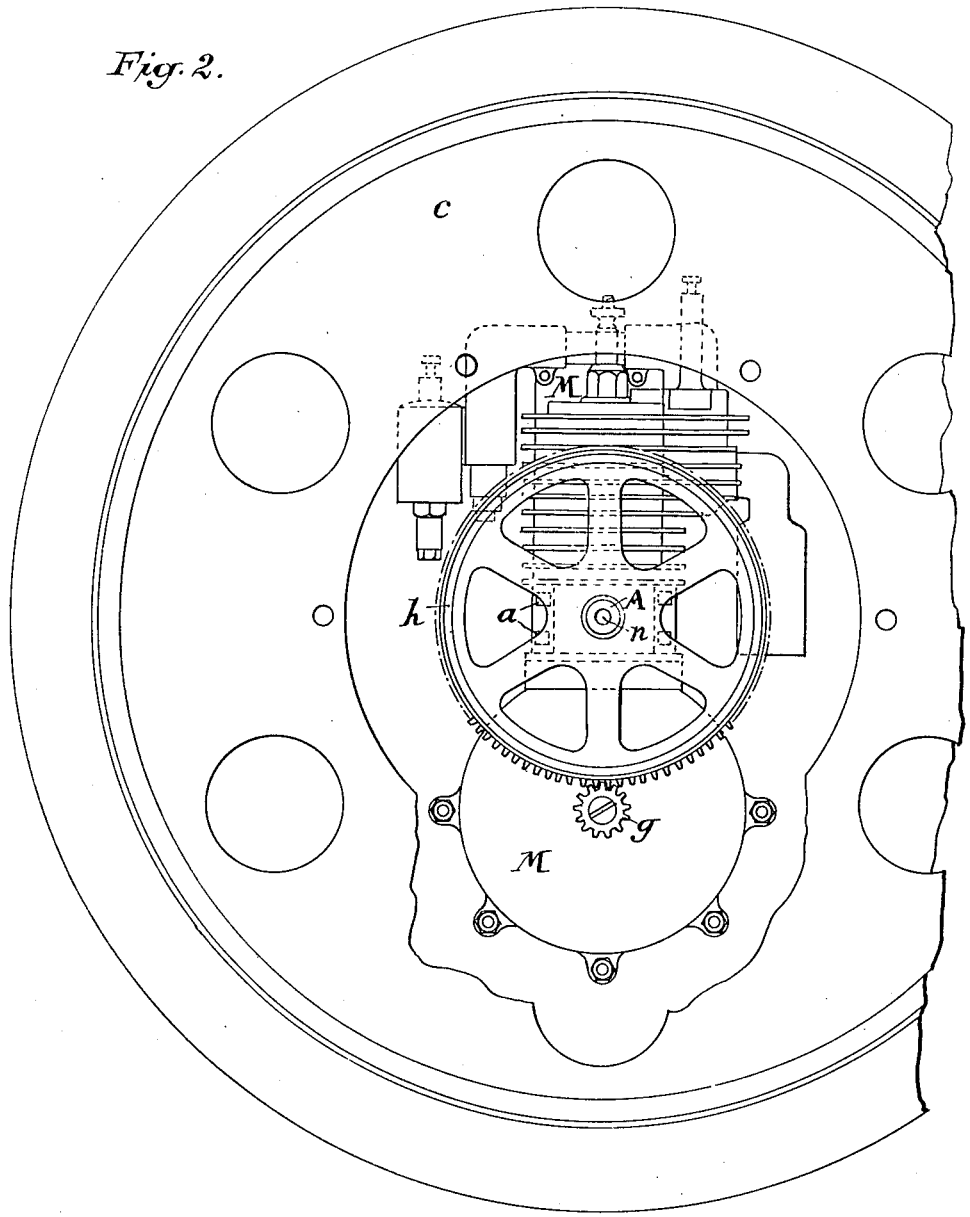

UNITED STATES PATENT OFFICE.

JULES EMILE PÉRILLARD, OF GENEVA, SWITZERLAND.

MOTOR-WHEEL FOR CYCLES.

No. 904,721.    Specification of Letters Patent.    Patented Nov. 24, 1908.

Application filed April 1, 1907.    Serial No. 365,654.

*To all whom it may concern:*

Be it known that I, JULES EMILE PÉRILLARD, a citizen of Switzerland, residing at Geneva, Switzerland, have invented certain new and useful Improvements in Motor-Wheels for Cycles; and I do hereby declare the following to be a full, clear, and exact description of the invention, such as will enable others skilled in the art to which it appertains to make and use the same, reference being had to the accompanying drawings, and to figures of reference marked thereon, which form a part of this specification.
The objects of the present invention are to construct a motor-wheel which is very flat so that it can be placed in a common bicycle frame, to provide means whereby the motor can be disconnected and the road-wheel turned by the pedals of the cycle, and to secure other advantages and results as will be hereinafter described and finally pointed out in the claims.

I am aware that several attempts have been made to construct road-wheels for cycles carrying upon a fixed spindle a motor located inside the wheel to drive same, but none of the constructions known to me have been successful and in public use.
In the accompanying drawings, like letters of reference indicate similar parts in all the figures where they occur.

Figure 1:
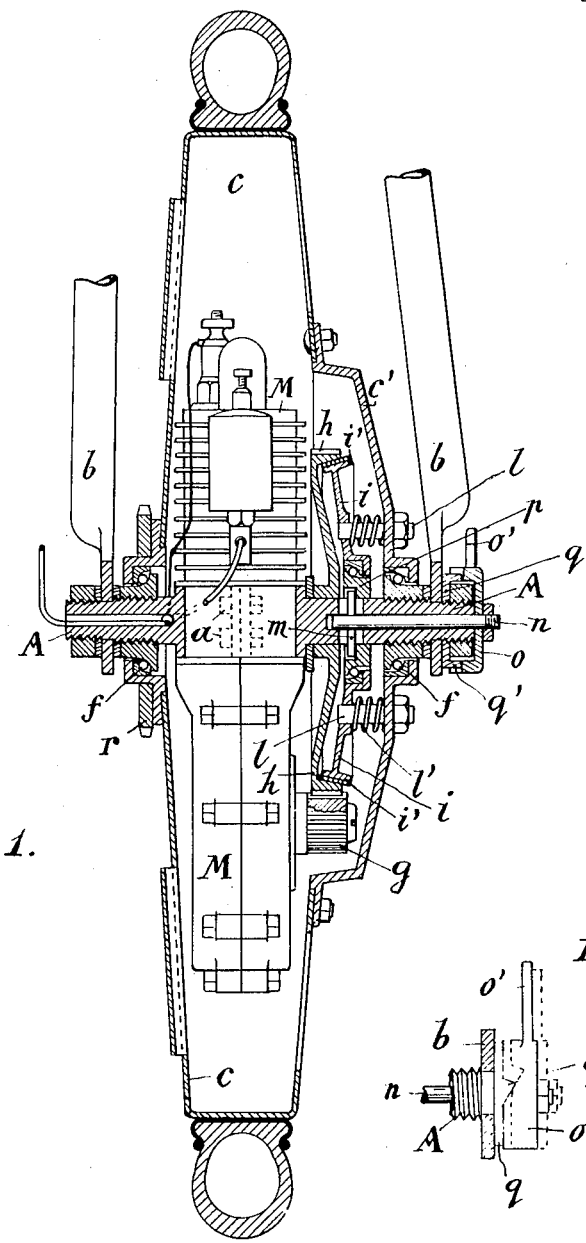
Figure 3:
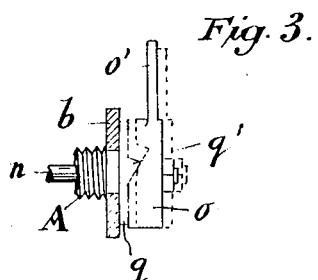

Figure 1 is a vertical section through the road-wheel showing in elevation the motor located therein; Fig. 2 is a part side elevation of the wheel after removal of a central disk giving access to the motor, and Fig. 3 illustrates a detail of the mechanism which serves to operate a friction clutch adapted between the road-wheel and the motor.

In the said drawings, M is the explosion motor which is suspended upon the spindle A made in two parts encircling the motor with their inner forked ends united by bolts $a$. The spindle A is firmly supported in the hind fork $b$ of the bicycle frame and the road-wheel is made out of two parts, a drum $c$ carrying the pneumatic tire and a disk $c'$ bolted upon the said drum. The road wheel thus has a divided hub which is adjusted upon the spindle A to each side of the motor through intermediary of ball bearings $f$. The motor M is especially flat and carries all its accessories, carbureter, exhaust, igniter, a. s. o. It receives fuel by a pipe passing through the bored out left hand part of the spindle A. The motor has a pinion $g$ which engages a toothed wheel $h$ idle upon the right hand part of the spindle A. This gear wheel meshing with the motor pinion forms one half of a friction clutch whereby the road-wheel is carried around the motor and fixed spindle A, the other half of said clutch being secured to the road-wheel. This latter part consists in a spring-actuated disk $i$ with a peripheral conical crown $i'$ covered with leather, fiber or other appropriate material capable to grip smoothly upon the corresponding conical contact surface near the periphery of the gear wheel $h$.

The clutch part $i$ is carried by fingers $l$ upon the wheel disk $c'$; it is adapted to slide upon said fingers and constantly pressed against the gear wheel $h$ by springs $l'$ mounted upon said fingers $l$ between the wheel disk $c'$ and the clutch part $i$. This latter has a hub $p$ mounted idly upon the spindle A and is adapted to slide longitudinally upon the said spindle so that it may serve to uncouple the clutch if one withdraws the part $i$ from the gear wheel $h$. To effect this separation a clutch operating mechanism serves which consists in a stem $n$ located in the bored out right hand side spindle part A and a cam cap $o$ mounted upon the outer end of said stem. This cap $o$ meshes with a cam disk $q$ having tooth shaped cams $q'$ (Figs. 1 and 3) so that by turning the cap $o$ a given angle it will mount upon said cams $q'$ and withdraw the stem $n$. This latter has a transverse pin $m$ which engages the bearing $p$ of the clutch disk $i$ so that when the stem $n$ is drawn out, the said disk $i$ is removed from the gear wheel $h$ against the resiliency of the springs $l'$ and the clutch uncoupled whereby the motor and road-wheel become disconnected. The cam cap $o$ has a lever $o'$ whereby it can be turned and which is connected by a chain or wire to a hand lever upon the guidon (not shown in the drawing) to operate it. This hand lever can even be combined with a locking device to keep the motor permanently disconnected from the road-wheel. Upon the latter is secured a pinion $r$ which permits to drive it by chain from the pedals to start the motor and to run the wheel without the motor. In Fig. 1 the pinion $r$ is represented fast upon the hub of the road-wheel, but it will usually be mounted like an ordinary free wheel pinion of a bicycle turning around only when operated by the pedals, as will be understood.

4. A motor driven wheel comprising a hollow drum forming a wheel, a motor therein, a fixed spindle secured in a vehicle frame and supporting the motor, the spindle being perforated on one end, a clutch member on the motor, a clutch member on the wheel and having springs to normally throw it in engagement with the clutch member on the motor, a stem in the spindle having a pin transversely arranged on its inner end to engage the sliding clutch member to operate it against the action of the springs, and means on the projecting end of the stem for its manual manipulation.

5. A motor driven wheel comprising a hollow drum forming a wheel, a motor therein, a fixed spindle secured in a vehicle frame and supporting the motor, the spindle being perforated on one end, a clutch member on the motor, a clutch member on the wheel and having springs to normally throw it in engagement with the clutch member on the motor, a stem in the spindle having a pin transversely arranged on its inner end to engage the sliding clutch member to operate it against the action of the springs, a cam cap on the projecting end of the stem, cams on the vehicle frame for engaging the cam cap, and means on the cam cap for turning it.

In testimony, that I claim the foregoing I have hereunto set my hand this eighteenth day of March 1907.

JULES EMILE PÉRILLARD

Witnesses:
L. H. MUNIER,
R. TOLLBERGER.